(12) United States Patent
Brester

(10) Patent No.: US 10,124,741 B2
(45) Date of Patent: Nov. 13, 2018

(54) ELECTRONICS MODULE FOR MIRRORS

(71) Applicant: Robert R. Brester, New Berlin, WI (US)

(72) Inventor: Robert R. Brester, New Berlin, WI (US)

(73) Assignee: VELVAC INCORPORATED, New Berlin, WI (US)

(*) Notice: Subject to any disclaimer, the term of this patent is extended or adjusted under 35 U.S.C. 154(b) by 220 days.

(21) Appl. No.: 14/074,271

(22) Filed: Nov. 7, 2013

(65) Prior Publication Data

US 2014/0063231 A1    Mar. 6, 2014

Related U.S. Application Data

(63) Continuation of application No. 11/591,009, filed on Oct. 31, 2006, now Pat. No. 8,602,573.

(51) Int. Cl.
*B60R 1/06* (2006.01)
*B60R 11/04* (2006.01)
*B60R 1/12* (2006.01)

(52) U.S. Cl.
CPC ............... *B60R 11/04* (2013.01); *B60R 1/06* (2013.01); *B60R 1/0605* (2013.01); *B60R 1/12* (2013.01); *B60R 2001/1215* (2013.01); *B60R 2001/1253* (2013.01)

(58) Field of Classification Search
CPC ............. B60R 1/06; B60R 2001/1215; B60R 2001/1253; B60R 1/0605; B60R 11/04; G09F 9/33

USPC .................. 359/871; 340/815.45; 362/494; 396/429, 541, 542; 348/148
See application file for complete search history.

(56) References Cited

U.S. PATENT DOCUMENTS

| | | | | |
|---|---|---|---|---|
| 2,831,152 A | * | 4/1958 | Dziergwa ............... | H01J 61/90 313/25 |
| 3,265,878 A | * | 8/1966 | Talbot ................. | B60Q 1/2615 362/143 |
| 4,447,808 A | * | 5/1984 | Marcus .................... | H04B 1/03 340/12.55 |
| 5,497,306 A | * | 3/1996 | Pastrick .............. | B60Q 1/2665 362/494 |
| 5,499,169 A | * | 3/1996 | Chen ........................ | B60Q 1/24 362/494 |
| 5,576,687 A | * | 11/1996 | Blank .................... | B60K 35/00 340/438 |
| 5,642,238 A | * | 6/1997 | Sala ..................... | B60Q 1/0023 348/148 |
| 5,660,457 A | * | 8/1997 | Lyons .................. | B60R 1/1207 340/472 |
| 5,938,322 A | * | 8/1999 | Alonzo, Jr. .......... | B60Q 1/2665 362/494 |
| 6,000,823 A | * | 12/1999 | Desmond ............ | B60Q 1/2665 362/135 |
| 6,049,271 A | * | 4/2000 | Chu ...................... | B60R 1/1207 340/463 |

(Continued)

*Primary Examiner* — Ricky D Shafer
(74) *Attorney, Agent, or Firm* — Schiff Hardin LLP

(57) ABSTRACT

An electronics module is attachable to an exterior mirror of a vehicle and supports a camera and/or a display. The electronics module may be an add-on device that is retrofittable to the exterior mirror. The display may be arranged to display an indication of a distance between a back of the vehicle and an object.

10 Claims, 8 Drawing Sheets

(56) References Cited

U.S. PATENT DOCUMENTS

| | | | | |
|---|---|---|---|---|
| 6,151,065 A * | 11/2000 | Steed | ................ | B60Q 1/0023 |
| | | | | 348/148 |
| 6,325,517 B1 * | 12/2001 | Kuo | .................. | B60Q 1/2665 |
| | | | | 340/475 |
| 6,447,128 B1 * | 9/2002 | Lang | ..................... | B60R 1/00 |
| | | | | 359/871 |
| 6,511,192 B1 * | 1/2003 | Henion | ............. | B60Q 1/2665 |
| | | | | 248/476 |
| 6,520,690 B2 * | 2/2003 | Chu | ..................... | B60R 1/12 |
| | | | | 340/457 |
| 6,932,497 B1 * | 8/2005 | Huang | .............. | B60Q 1/2665 |
| | | | | 340/475 |
| 6,959,994 B2 * | 11/2005 | Fujikawa | ............. | B60R 1/00 |
| | | | | 348/148 |
| 6,981,788 B2 * | 1/2006 | Iwai | .................. | B60Q 1/2665 |
| | | | | 362/235 |
| 7,050,089 B2 * | 5/2006 | Nakamura | .......... | B60Q 1/2665 |
| | | | | 340/901 |
| 7,391,014 B2 * | 6/2008 | Saccagno | .............. | B60R 1/12 |
| | | | | 250/208.1 |
| 7,445,392 B2 * | 11/2008 | Straehle | ............... | B60R 1/002 |
| | | | | 296/1.11 |
| 7,677,775 B2 * | 3/2010 | Oehmann | .......... | B60Q 1/2665 |
| | | | | 340/475 |
| 8,602,573 B2 * | 12/2013 | Brester | .............. | B60R 1/0605 |
| | | | | 340/435 |
| 2002/0011927 A1 * | 1/2002 | Lang | .................... | B60R 1/00 |
| | | | | 340/436 |
| 2003/0098908 A1 * | 5/2003 | Misaiji | ................ | B60R 1/00 |
| | | | | 348/148 |
| 2004/0190303 A1 * | 9/2004 | Mishimagi | .......... | B60R 1/1207 |
| | | | | 362/494 |

* cited by examiner

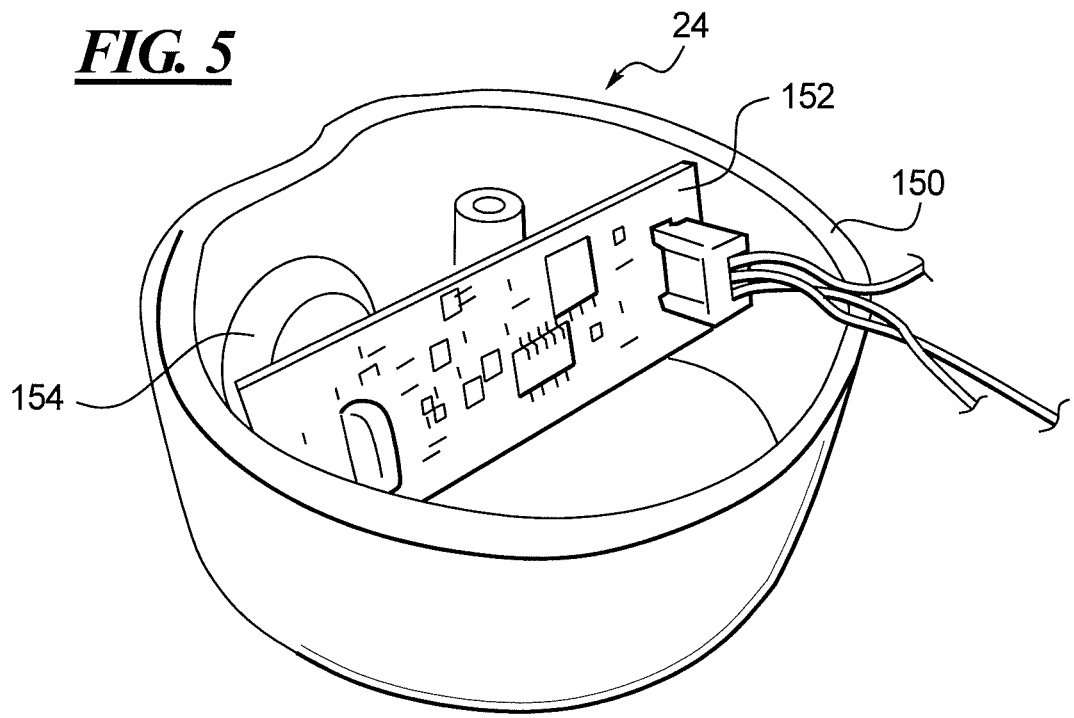
FIG. 5
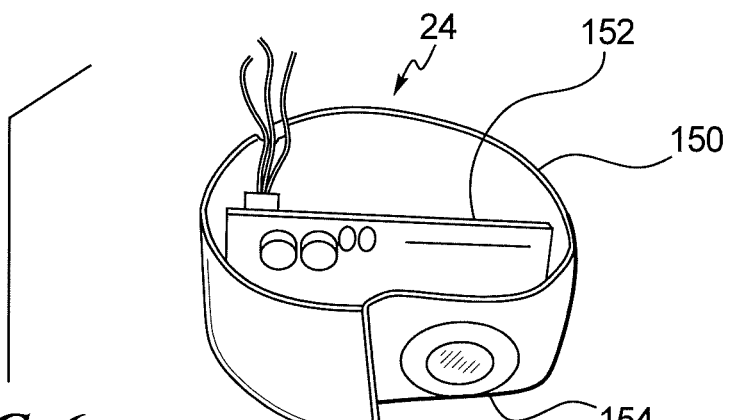
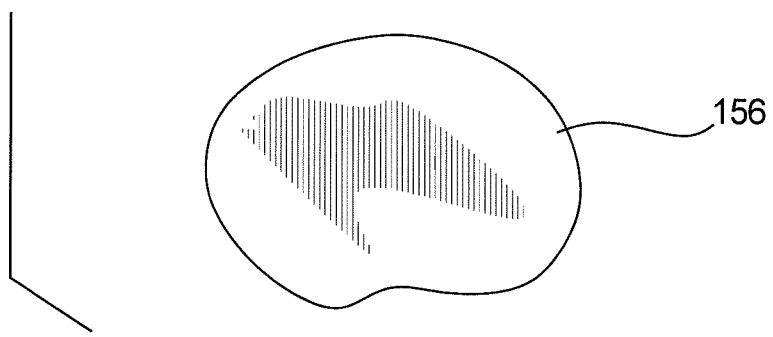
FIG. 6

ELECTRONICS MODULE FOR MIRRORS

CROSS-REFERENCE TO RELATED APPLICATIONS

This application is a continuation of U.S. Utility patent application Ser. No. 11/591,009, filed Oct. 31, 2006, the entire disclosure of which is incorporated herein by reference.

FIELD

The present application contains subject matter relating to an electronics module that can be incorporated into mirrors such as the exterior rear view mirrors of vehicles.

BACKGROUND

Exterior rear view mirrors are mounted to one or both sides of a vehicle such as an automobile, truck, sports utility vehicle, recreational vehicle, etc. Such mirrors permit the operator of the vehicle a rearward and sideward view from the vehicle.

An exterior rear view mirror typically includes a mirror housing and a mounting arm that is arranged to attach the mirror housing to a door or other exterior portion of the vehicle. Normally, the mounting arm supports the mirror housing on the vehicle such that the mirror housing extends away from the vehicle. However, the mirror housing may be foldably attached to the mounting arm such that the mirror can be folded to a position where the mirror housing extends along a side of the vehicle.

An exterior rear view mirror also typically includes an actuator within the mirror housing. The actuator is controlled in accordance with control signals originating from a control panel within the vehicle's interior to remotely drive the mirror to a desired viewing position. Thus, the control panel typically allows the vehicle operator to adjust the mirror up, down, right, and left.

It is further known to provide exterior rear view mirrors with accessories. For example, it is known to provide security and signal lights in the mirror housing of the rear view exterior mirror. The security light, when energized, lights up the exterior of the vehicle near the doors of the vehicle. The signal light may be used to indicate that the driver intends to execute a turn or lane change and may also be arranged to indicate that the driver has applied the brakes of the vehicle.

It has also been suggested to provide other accessories in the mirror housing of the rear view exterior mirror. Such other accessories can include a temperature sensor, a variable electrochromic reflective element, and a camera.

The present invention is directed to accessory features for mirrors that are not known or suggested in the prior art.

SUMMARY

In accordance with one independent aspect of the present invention, an exterior mirror assembly comprises a mirror housing, a mirror, a camera, a display, and a mounting arm. The mirror is supported by the mirror housing. The camera is supported by the mirror housing so that a direction of a viewing field of the camera is adjustable relative to the mirror housing. The display is supported by the mirror housing. The mounting arm has first and second ends, the first end of the mounting arm is attachable to the mirror housing, and the second end of the mounting arm is configured to attach the mirror housing to an exterior of a vehicle.

In accordance with another independent aspect of the present invention, a method comprises the following: reflecting an image by use of a mirror supported by a mirror housing so that the reflected image can be viewed by an occupant of a vehicle, wherein the image is generally rearward of the vehicle; and, displaying an indication of a distance between the vehicle and an object by use of a display mounted to the mirror housing.

In accordance with still another independent aspect of the present invention, an electronics module for attachment to an exterior mirror of a vehicle comprises a module housing, fastening devices, a camera, a display, and an adjustment member. The fastening devices permit the module housing to be fastened to the exterior mirror. The camera and the display are supported by the module housing. The adjustment member permits an angle of the camera with respect to the module housing to be repeatedly adjusted thereby permitting a direction of a viewing field of the camera to be repeatedly adjusted.

In accordance with yet another independent aspect of the present invention, an electronics module for attachment to an exterior mirror of a vehicle comprises a module housing, fastening devices, a camera, and an adjustment member. The fastening devices permit the module housing to be fastened to the exterior mirror. The camera is supported by the module housing. The adjustment member permits an angle of the camera with respect to the module housing to be repeatedly adjusted thereby permitting a direction of a viewing field of the camera to be repeatedly adjusted.

In accordance with a further independent aspect of the present invention, an add-on electronics module for retrofit attachment to an exterior mirror of a vehicle comprises a module housing, fastening devices, and electronics. The module housing has a shape conforming to a shape of an end of the exterior mirror so as to facilitate retrofitting of the add-on electronics module to the exterior mirror. The fastening devices permit the module housing to be fastened to the exterior mirror, and the fastening devices are arranged to facilitate retrofitting of the add-on electronics module to the exterior mirror. The electronics are supported by the module housing.

BRIEF DESCRIPTION OF THE DRAWINGS

These and other features and advantages will become more apparent from the detailed description below when taken in conjunction with the drawings in which:

FIG. 5 illustrates a perspective view of a camera assembly that, according to one embodiment, forms a part the mirror assembly of FIG. 1;

FIG. 6 illustrates another perspective view of the camera assembly of FIG. 5;

DETAILED DESCRIPTION

As shown in FIGS. 1-9, a mirror assembly 10 includes a mirror housing 12 and a mounting arm 13. The mounting arm 13 is configured to mount the mirror housing 12 to an exterior of a vehicle such that the mirror housing 12 is outside of the vehicle. For example, the mounting arm 13 is configured to mount the mirror housing 12 to an exterior surface of a door of the vehicle so that the driver while sitting in a position to drive the vehicle can look at the mirror assembly 10 through a window of the vehicle. Accordingly, the mounting arm 13 has an exterior mounting bracket 14 that attaches to an exterior surface of a vehicle in order to mount the mirror assembly 10 to the exterior of the vehicle.

Figure 1:
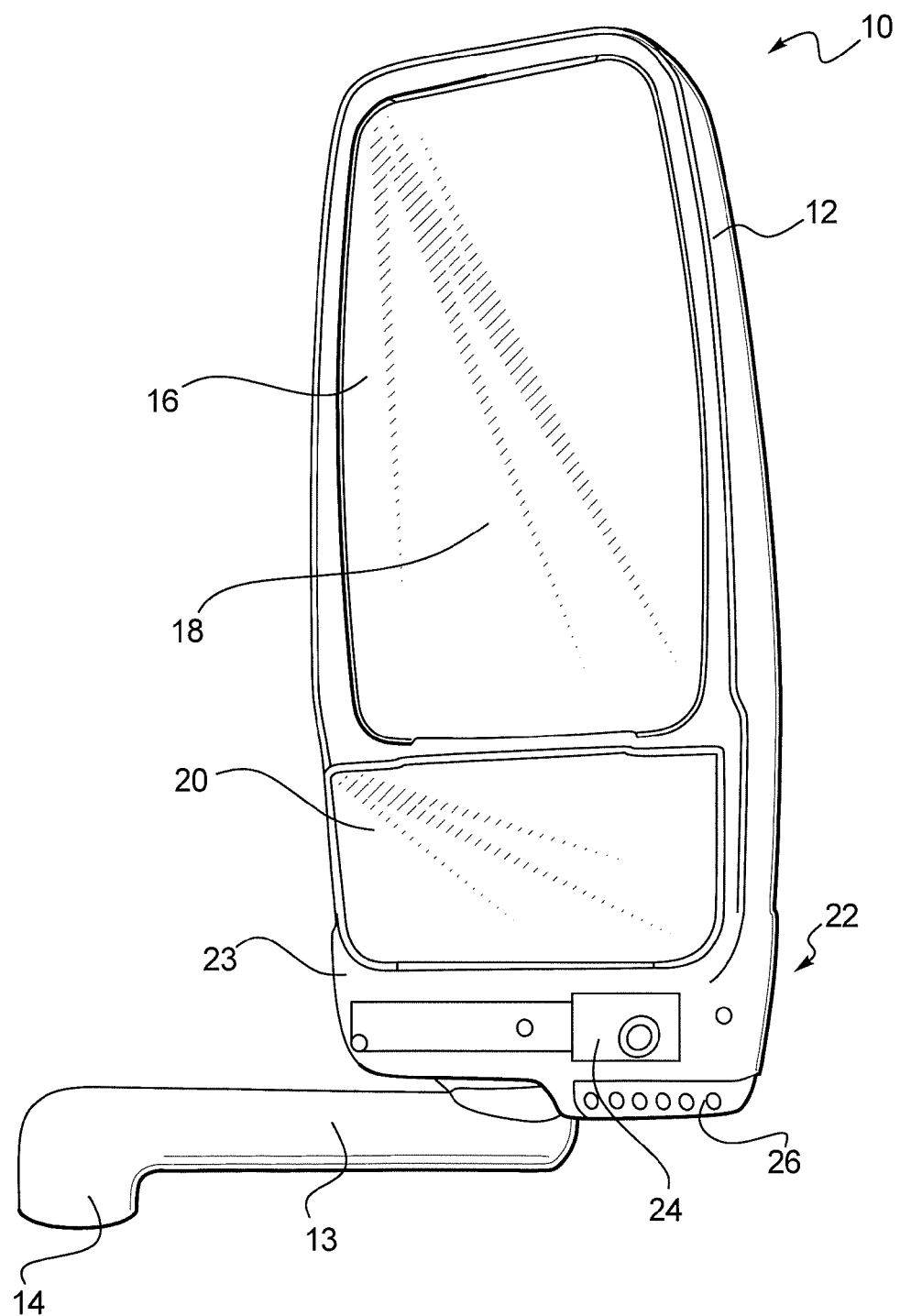
FIG. 1 illustrates a full view of a rearwardly facing surface of a mirror assembly as described below.
Figure 2:
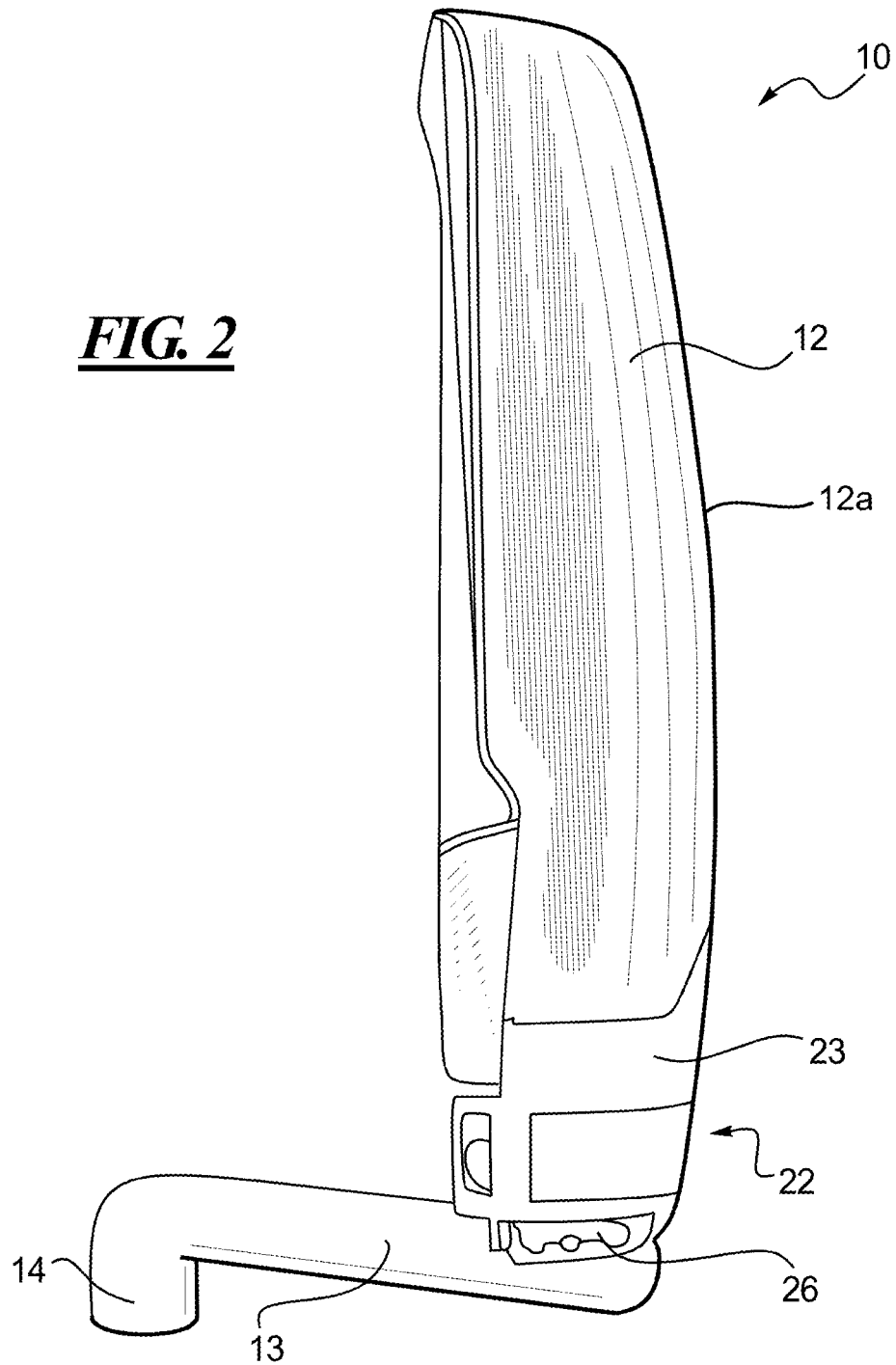
FIG. 2 illustrates a side view of the mirror assembly of FIG. 1.
Figure 3:
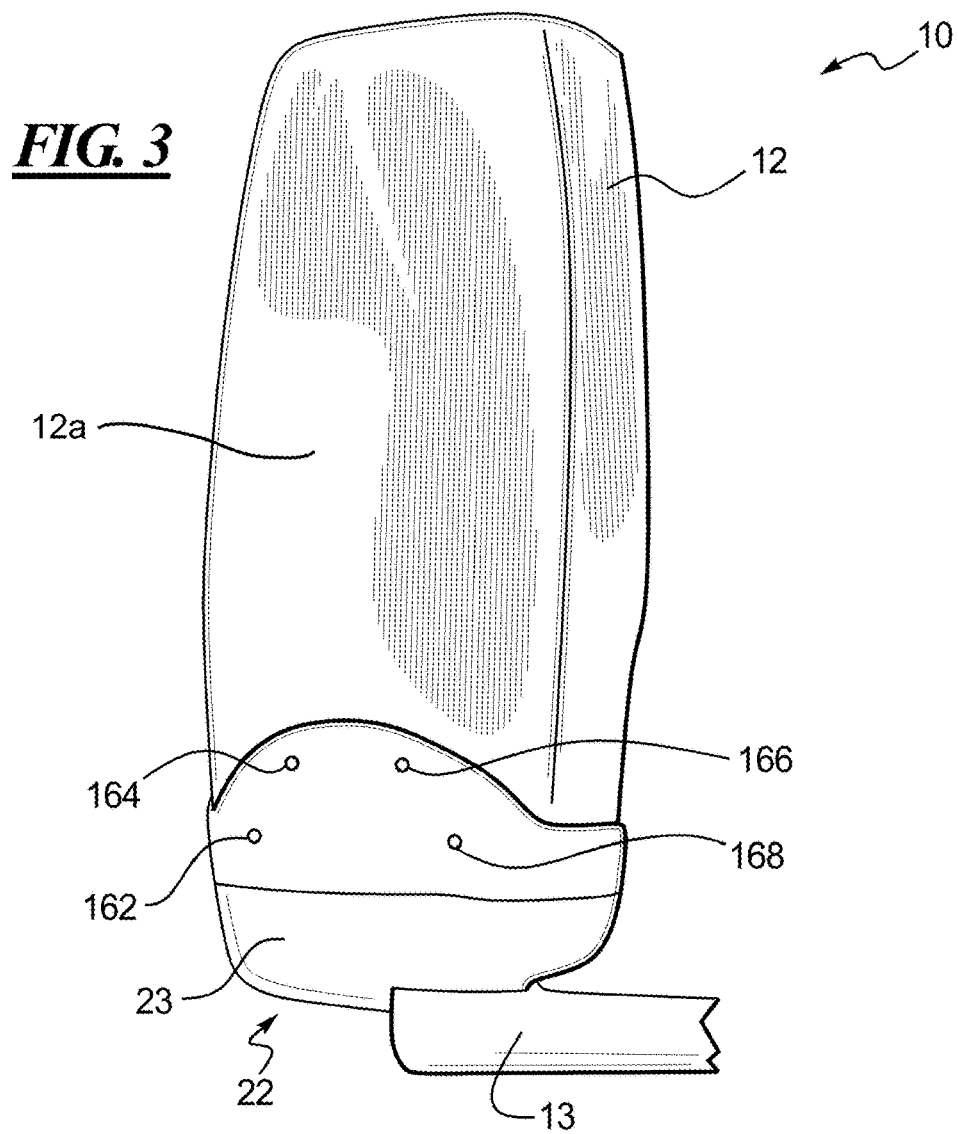
FIG. 3 illustrates a view of a forwardly facing surface the mirror assembly of FIG. 1.
Figure 4:
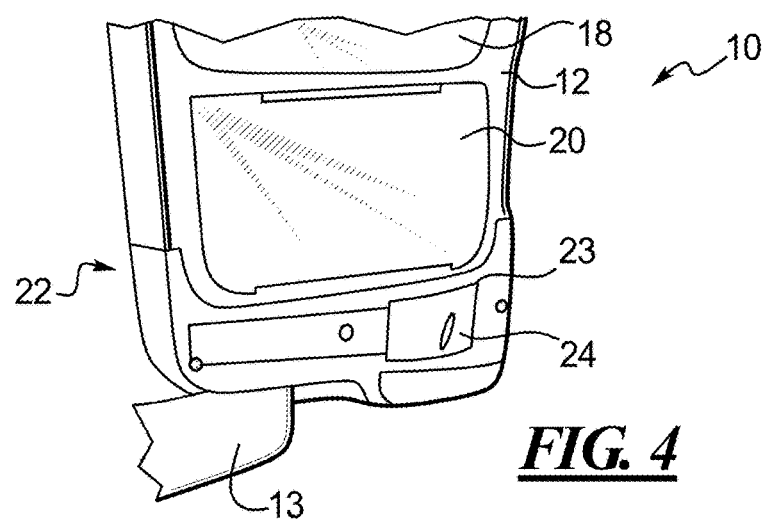
FIG. 4 illustrates a close up view of the rearwardly facing surface of the mirror assembly of FIG. 1.
Figure 9:
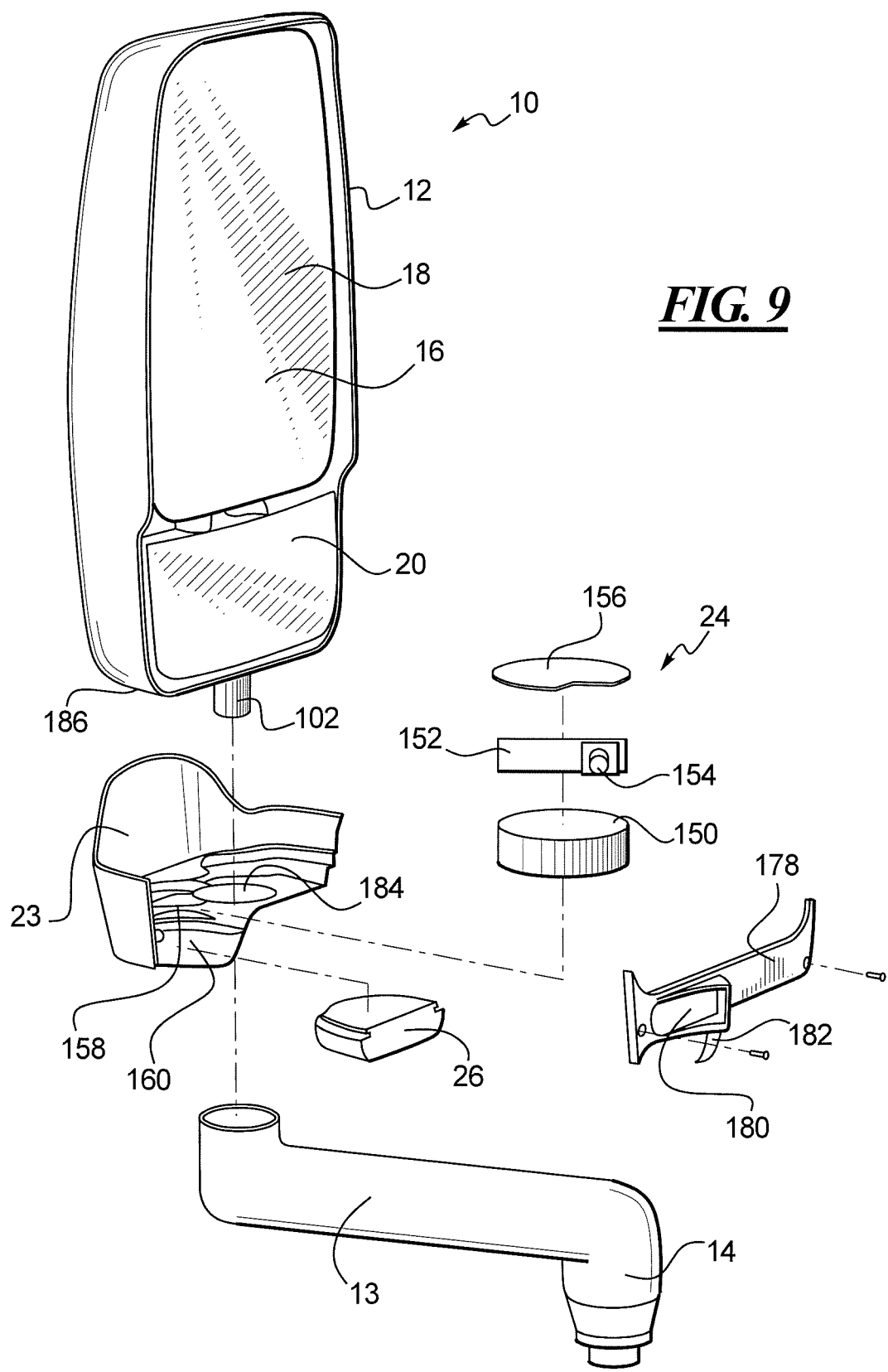
FIG. 9 illustrates an exploded view of the mirror assembly of FIG. 1.

As shown in FIGS. 1, 4, and 9, the mirror housing 12 supports a mirror 16 so that the vehicle user can view images reflected by the mirror 16. FIG. 1 shows the rearwardly directed surface of the mirror assembly relative to the direction of travel of the vehicle, as is known to those of skill in the art. FIG. 2 shows a side view and FIG. 3 shows the forwardly facing surface relative to the direction of travel, as is known to those of skill in the art. As shown in FIGS. 4 and 5, one embodiment of the mirror 16 includes individually adjustable first and second mirror sections 18 and 20. Thus, the first and second mirror sections 18 and 20 may be individually adjustable or positionable so that the vehicle user can independently adjust each of the first and second mirror sections 18 and 20 for a different reflection angle and a correspondingly different viewing angle. However, it should be understood that fewer or more mirror sections can be supported by the mirror housing 12. For example, the mirror housing 12 can be arranged to support a single mirror section. Moreover, the first and second mirror sections 18 and 20 can be variably reflective mirror sections, such as electrochromic mirror sections, whose reflectivity can be changed. Accordingly, the reflectivity of such mirror sections, for example, can be changed according to driving conditions such as daytime and nighttime driving conditions.

The mirror housing 12 also supports an electronics module 22. The electronics module 22 may be regularly provided as an element of the mirror assembly 10 or the electronics module 22 may be modularly offered as an optional add-on accessory. In either one or both of these cases, the electronics module 22 may be arranged to closely integrate with the mirror housing 12.

The electronics module 22 includes a module housing 23 supporting a camera assembly 24 and a display 26. In FIGS. 1, 2, 3 and 4, the module housing 23 is shown at a lower end of the mirror housing 12. In FIGS. 2 and 3 is shown a forwardly facing portion 12a of the mirror housing 12 that is free of the module housing 23, as is apparent from the figures. The camera assembly 24 includes a camera such as a video or other camera that views, for example, to the rear and side of the vehicle to which the mirror assembly 10 is attached.

The display 26 may comprise one or more lights (such as light emitting diodes) that may be controlled to display various conditions. For example, when the vehicle is backing up, the display 26 can be controlled to indicate proximity of the vehicle to objects, such as objects alongside of or behind the vehicle. Such a display may be in the form of colors that change as the rear or sides of the vehicle approaches or draws away from the object (for example, the colors turn progressively from green to yellow to red as the distance between the vehicle and the object closes). Alternatively, the display 26 may be a digital or analog display element that can display a bar whose length decreases as the rear or sides of the vehicle approaches the object, or numbers that indicate the number of feet and/or inches between the rear or sides of the vehicle and the object, or other symbols that moving closer together as the vehicle moves closer to the object, etc. As a further alternative, the display 26 may be arranged to display text and/or graphics. This text and/or graphics can be used to provide to the vehicle operator various information such as distance between the vehicle and an object.

In the case of either an exterior or an interior mirror, this type of distance related display is particularly advantageous. Vehicle users, such as those operating trucks and RVs, often use their mirrors to assist in backing up their vehicles or in making lane changes. This distance related display helps these vehicle users to more accurately determine distances between objects and their vehicles. Moreover, because the distance related display is on the mirrors that the vehicle users are using to back up their vehicles, these users do not have to divert their attention away from the mirror to read the distance related display.

Additionally or alternatively, the display 26 may be a device that is capable of displaying various conditions such as temperature and direction. However, the display 26 may also be arranged to provide other displays to the vehicle user such as trip mileage, fuel economy, destination to empty, odometer readings, etc.

Also, the display 26 may be arranged to display such proximity information based on information supplied by sensors such as a proximity sensor that senses the proximity between the rear or sides of the vehicle and objects behind or to the side the vehicle, and the display 26 can be controlled in response to an output from this proximity sensor. The proximity sensor can be any type of sensor that senses proximity, such as a vehicle on-board radar, infrared sensors, laser sensors, digital image processing, etc.

In another embodiment, the mirror housing 12 may be arranged to support a light (not shown). This light can have one or more functions such as to indicate turns, to indicate braking, to provide security lighting along the sides of the vehicle such as at its doorways, etc.

The mirror housing 12 houses other components such an actuator, a position sensor, and a heating element for each of the first and second mirror sections 18 and 20 and a mirror housing printed circuit board coupled to the actuators, position sensors, and heating elements.

Figure 10:
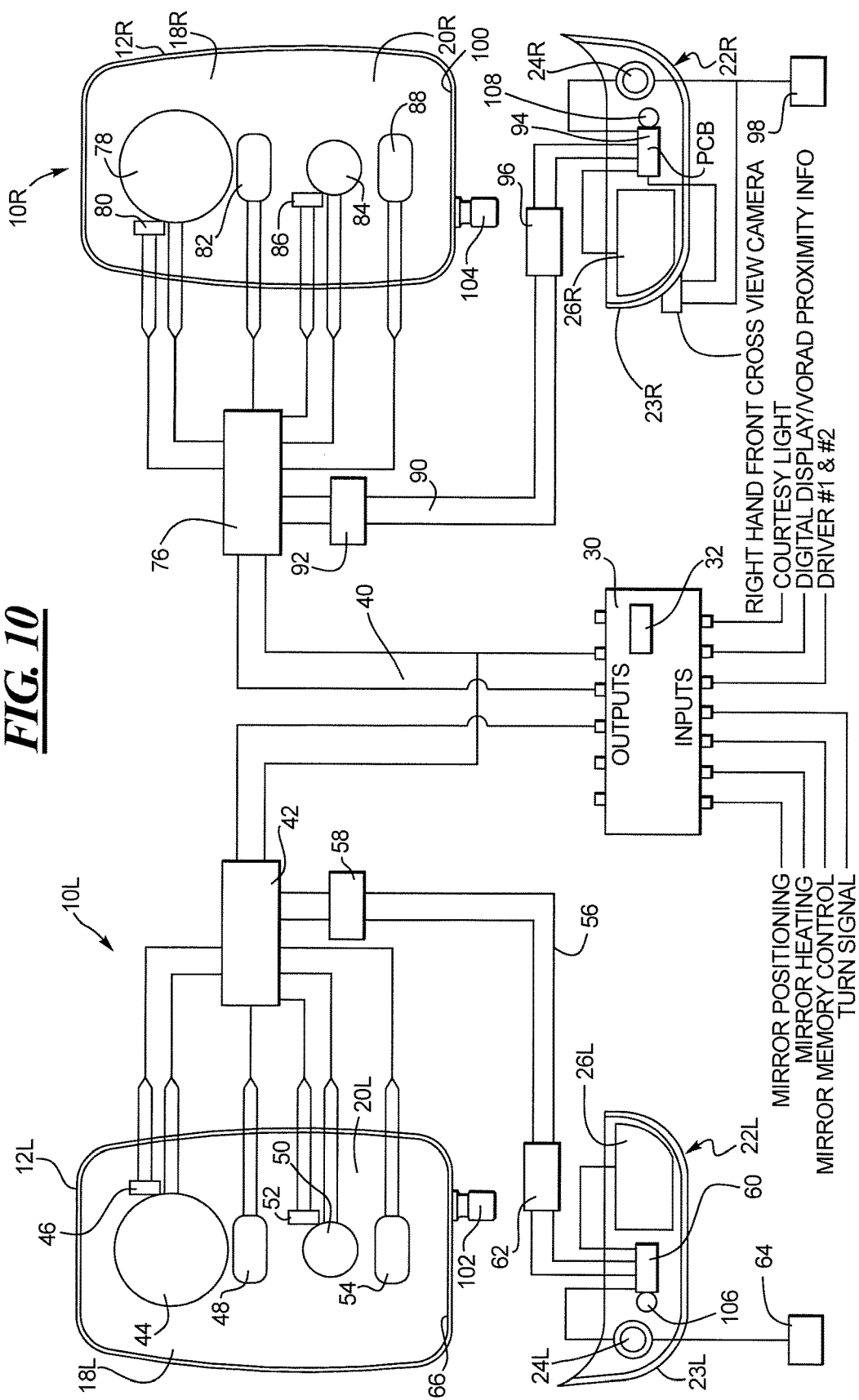
FIG. 10 illustrates a wiring diagram for a pair of mirror assemblies, each being similar to the mirror assembly shown in FIGS. 1-9; and, FIG. 11 illustrates a flow chart of a program that can be executed to display distance related information on a digital display included in the mirror assembly.

FIG. 10 shows an example of a wiring diagram that can be used with the mirror assembly 10. However, it should be understood that wiring diagrams other than the one shown in FIG. 10 could instead be used with the mirror assembly 10. As shown in FIG. 10, a left hand mirror assembly 10L and a right hand mirror assembly 10R are coupled to a junction box 30 that contains a junction box printed circuit board 32.

The left hand mirror assembly 10L includes a left hand mirror housing 12L and a left hand electronics module 22L having a module housing 23L, and the right hand mirror assembly 10R includes a right hand mirror housing 12R and a right hand electronics module 22R having a module housing 23R. An input/output cable 40 provides power and control lines between the junction box printed circuit board 32 and a mirror housing printed circuit board 42 in the left hand mirror housing 12L.

The left hand mirror housing 12L includes an actuator 44, a position sensor 46, and a heating element 48 for the first mirror section 18L. The actuator 44 positions the first mirror section 18L in response to mirror positioning signals received by the junction box printed circuit board 32 and passed by the junction box printed circuit board 32 over the input/output cable 40 to the mirror housing printed circuit board 42 in the left hand mirror housing 12L. The position sensor 46 senses the position of the first mirror section 18L and sends corresponding position signals to the junction box printed circuit board 32 through the mirror housing printed circuit board 42 and over the input/output cable 40. The heating element 48 provides heat to the first mirror section 18L in response to mirror heating instructions received by the junction box printed circuit board 32 and passed by the junction box printed circuit board 32 over the input/output cable 40 to the mirror housing printed circuit board 42 in the left hand mirror housing 12L.

The left hand mirror housing 12L also includes an actuator 50, a position sensor 52, and a heating element 54 for the second mirror section 20L. The actuator 50, the position sensor 52, and the heating element 54 are coupled and controlled in a similar manner to the actuator 44, the position sensor 46, and the heating element 48.

A cable 56 is connected to the mirror housing printed circuit board 42 by a plug type connector 58 and is connected to an electronics module printed circuit board 60 in the left hand electronics module 22L by a plug type connector 62. Accordingly, the cable 56 interconnects the mirror housing printed circuit board 42 and the electronics module printed circuit board 60. As shown in FIG. 10, the left hand camera assembly 24L and the left hand display 26L are coupled to the electronics module printed circuit board 60. As also shown in FIG. 10, the left hand camera assembly 24L may also be coupled to a monitor 64 such as a CRT or LCD panel. The monitor 64 may be used to display video and/or other intelligence based on the output of the left hand camera assembly 24L. The monitor 64 in one embodiment is located in the cab of the vehicle in a position to be observed by the vehicle user. In another additional or alternative embodiment, the output of the left hand camera assembly 24L can be displayed on the left hand display 26L.

As shown in FIG. 10 and as explained below, the left hand electronics module 22L is attached at a lower end 66 of the left hand mirror housing 12L. For example, the left hand electronics module 22L may be attached to the lower end 66 by suitable fastening devices such as screws, rivets, adhesive, etc.

The input/output cable 40 provides power and control lines between the junction box printed circuit board 32 and a mirror housing printed circuit board 76 in the right hand mirror housing 12R. The right hand mirror housing 12R includes an actuator 78, a position sensor 80, and a heating element 82 for the first mirror section 18R. The actuator 78 positions the first mirror section 18R in response to mirror positioning signals received by the junction box printed circuit board 32 and passed by the junction box printed circuit board 32 over the input/output cable 40 to the mirror housing printed circuit board 76. The position sensor 80 senses the position of the first mirror section 18R and sends corresponding position signals to the junction box printed circuit board 32 through the mirror housing printed circuit board 76 and over the input/output cable 40. The heating element 82 provides heat to the first mirror section 18R in response to mirror heating instructions received by the junction box printed circuit board 32 and passed by the junction box printed circuit board 32 over the input/output cable 40 to the mirror housing printed circuit board 76.

The right hand mirror housing 12R also includes an actuator 84, a position sensor 86, and a heating element 88 for the second mirror section 20R. The actuator 84, the position sensor 86, and the heating element 88 are coupled and controlled in a similar manner to the actuator 78, the position sensor 80, and the heating element 82.

A cable 90 is connected to the mirror housing printed circuit board 76 by a plug type connector 92 and is connected to an electronics module printed circuit board 94 in the right hand electronics module 22R by a plug type connector 96. Accordingly, the cable 90 interconnects the mirror housing printed circuit board 76 and the electronics module printed circuit board 94. As shown in FIG. 10, the right hand camera assembly 24R and the right hand display 26R are coupled to the electronics module printed circuit board 94. As also shown in FIG. 10, the right hand camera assembly 24R may also be coupled to a monitor 98 such as a CRT or LCD panel. The monitor 98 may be used to display video and/or other intelligence based on the output of the right hand camera assembly 24R. The monitors 64 and 98 may in fact be the same monitor or they may be different monitors located in the cab of the vehicle in a position to be observed by the vehicle user or at different locations within the vehicle. Additionally or alternatively, the output of the right hand camera assembly 24R can be displayed on the right hand display 26R.

As shown in FIG. 10 and as explained below, the right hand electronics module 22R is attached at a lower end 100 of the right hand mirror housing 12R. For example, the right hand electronics module 22R may be attached to the lower end 100 by suitable fastening devices such as screws, rivets, adhesive, etc.

The left and right hand mirror housings 12L and 12R have corresponding posts 102 and 104 for attaching the left and right hand mirror housings 12L and 12R to their corresponding mounting arms 13.

The mirror housing printed circuit boards 42 and 76 may, for example, contain sufficient circuit elements, chips, or the like to provide interfaces that route signals between the junction box printed circuit board 32 and the appropriate devices in the left and right hand mirror housings 12L and 12R. Moreover, if the input/output cable 40 is a multiplexed cable, then the junction box printed circuit board 32 and the mirror housing printed circuit boards 42 and 76 may be provided with multiplexers and de-multiplexers to appropriately multiplex and de-multiplex the signals.

Additionally, a line of the input/output cable 40 may be arranged to provide power from the junction box 30 to the mirror housing printed circuit board 42, and the same or another line of the input/output cable 40 may be arranged to provide power from the junction box 30 to the mirror housing printed circuit board 76. Similarly, a line of the cable 56 may be arranged to provide power from the mirror housing printed circuit board 42 to the electronics module printed circuit board 60, and a line of the cable 90 may be arranged to provide power from the mirror housing printed circuit board 76 to the electronics module printed circuit board 94. In this manner, power is provided to any circuit components of the mirror housing printed circuit boards 42 and 76 and of the electronics module printed circuits board 60 and 94 that require power.

Further, lines in the cables 40, 56, and 90 carry the output or outputs from the camera assembly 24L and/or the camera assembly 24R to the monitor or monitors that display the output or outputs.

The junction box 30 receives power from driver lines and provides this power to the appropriate power lines in the input/output cable 40. In addition, the junction box 30 provides power to the junction box printed circuit board 32.

Figure 11:
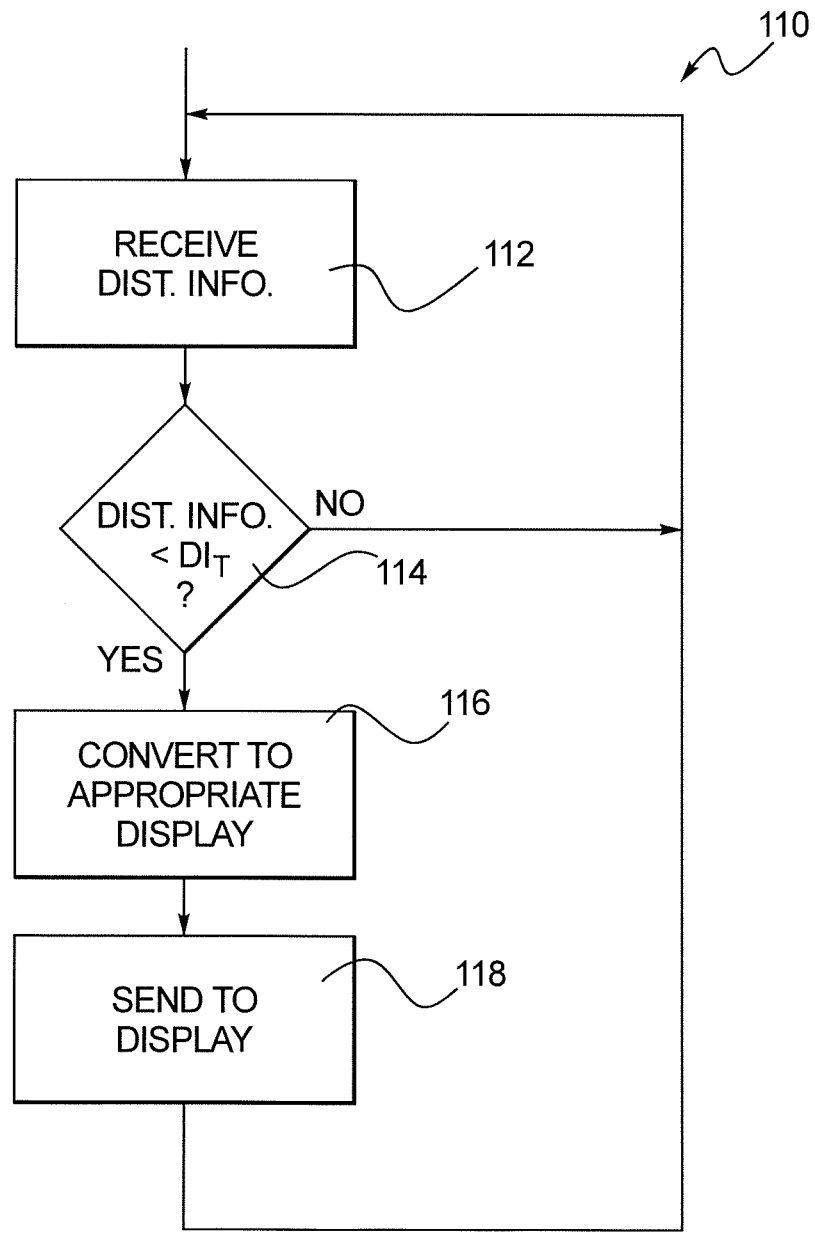

FIG. 11 illustrates a flow chart of a program 110 that can be executed by a processor to display distance related information on the display 26. This processor could be located on each of the mirror housing printed circuit boards 42 and 76 or on each of the electronics module printed circuit boards 60 and 94 so as to independently control their corresponding right and left digital displays. However, it may be preferable to coordinate the control of the right and left displays 26L and 26R so that they display exactly the same the distance related values to avoid confusion that could be caused by display different distance values between the two digital displays.

Alternatively, both displays could be controlled by the same processor located on either the mirror housing printed circuit board 42 or the mirror housing printed circuit board 76, or on either the electronics module printed circuit board 60 or the electronics module printed circuit board 94, or on the junction box printed circuit board 32, or elsewhere so that the distance related information that is displayed on both the left and right hand displays 26L and 26R are exactly the same.

As a further alternative, the display 26 may be provided on only one of the left and right hand mirror assemblies 10L and 10R.

A block 112 of the program 110 receives distance information from an appropriate sensor as discussed above, such as from a vehicle on board radar (VORAD), or from some other instrument. A block 114 determines whether this distance related information is sufficiently small to warrant its display on the display 26. If not, program flow returns to the block 112. However, if this distance related information is sufficiently small (less than a threshold $DI_T$) to warrant its display on the display 26, a block 116 converts the distance related information to a display format suitable for display on the display 26, and a block 118 sends the correctly formatted distance related information to the display 26 for display.

In another embodiment, the electronics module printed circuit board 60 may support or be coupled to a device 106 that controls the left hand display 26L or other display. For example, the device 106 may be a temperature sensor that causes the display of outside temperature, or the device 106 may be a compass that causes the display of direction. Alternatively, or additionally, the electronics module printed circuit board 94 may support or be coupled to a device 108 that controls the right hand display 26R or other display. For example, the device 108 may be a temperature sensor that causes the display of outside temperature, or the device 108 may be a compass that causes the display of direction. The device 106 and/or the device 108 may be supported elsewhere on the vehicle to send a signal to the appropriate electronic module printed circuit board for display on the appropriate display.

As shown in FIGS. 5, 6, and 9, the camera assembly 24 includes a camera assembly housing 150 that houses a printed circuit board 152 on which a camera 154 is mounted. The printed circuit board 152 carries the electronics that properly process the output of the camera 154 and that supply the processed output to the monitor that displays the output of the camera 154 to the user of the vehicle. The printed circuit board 60 may be the same as or different from the printed circuit board 152. A cover 156 covers the top of the camera assembly housing 150.

Figure 7:
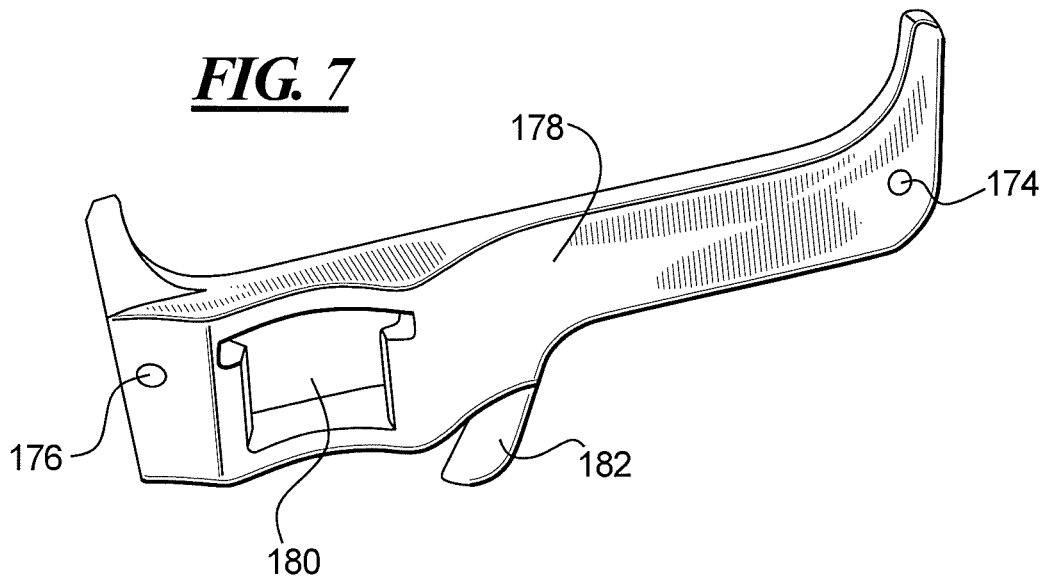
FIG. 7 illustrates a clamp for the camera assembly of FIG. 5.
Figure 8:
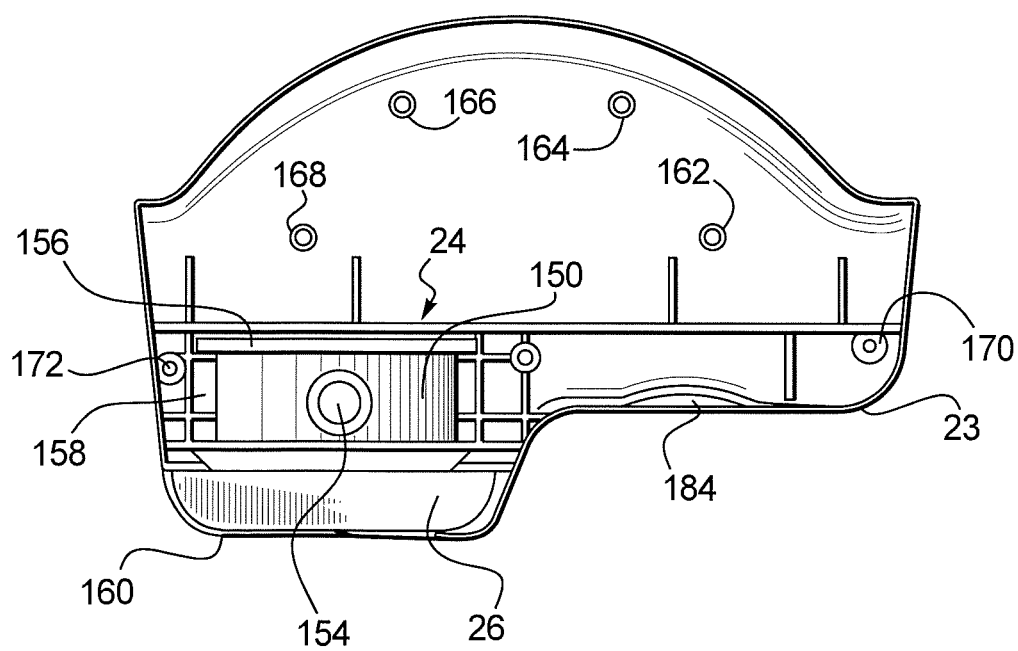
FIG. 8 illustrates the camera assembly of FIG. 5 housed in an electronics module of the mirror assembly of FIG. 1 with the clamp removed.

As shown in FIGS. 8 and 9, the module housing 23 has a first bay 158 that receives the camera assembly 24 and a second bay 160 that receives the display 26. As shown in FIGS. 3 and 8, the back of the module housing 23 has holes 162, 164, 166, and 168 to receive suitable fasteners that fasten the module housing 23 to the mirror housing 12. As shown in FIGS. 7 and 8, the module housing 23 also has holes 170 and 172 that cooperate with holes 174 and 176 through a clamp 178 to receive suitable fasteners that fasten the clamp 178 to the module housing 23.

During assembly, the camera assembly 24 is inserted into the first bay 158 of the module housing 23. Also, the display 26 is inserted into the second bay 160 of the module housing 23. The camera assembly 24 may be rotated in the first bay 158 of the module housing 23 until the desired direction for the viewing field of the camera 154 is achieved. The clamp 178 is fastened to the module housing 23 so as to clamp 178 the camera assembly 24 in the first bay 158 of the module housing 23 at the desired viewing field direction. Accordingly, the clamp 178 clamps the camera assembly 24 in the module housing 23 so as to maintain and fix the desired viewing field direction for the camera 154. If it is desired to change the viewing field direction for the camera 154 either before or after the electronics module 22 is fastened to mirror assembly 10, the clamp 178 may be removed, the camera assembly 24 may be rotated in the first bay 158 of the module housing 23 until the new desired viewing field direction is achieved for the camera 154, and the clamp 178 may then be re-fastened to the module housing 23.

The clamp 178 has a window 180 through which the field of view of the camera 154 extends. The clamp 178 also has an arm 182 that clamps the display 26 in the second bay 160 of the module housing 23.

As shown in FIGS. 8 and 9, an opening 184 through a floor of the module housing 23 accommodates the post 102 when the module housing 23 is applied to the mirror housing 12. Further, the shape of the module housing 23 matches an end 186 of the mirror housing 12 so that the end 186 is snugly received by the module housing 23.

Wiring that couples the mirror assembly 10 to the controls and monitors within the vehicle may be run through the post 102, the mounting arm 13, and the exterior mounting bracket 14.

As can be seen from the above description, the electronics module 22 is capable of being retrofitted to the mirror assembly 10 and/or the electronics module 22 may be supplied as an optional add-on accessory. In either case, an existing mirror assembly such as the mirror assembly 10 is removed from its mounting arm 13, the wiring between the mirror assembly 10 and the vehicle is disconnected, is re-run through the module housing 23, and is reconnected, the electronics module 22 is fastened to the mirror housing 12, and the mirror housing 12 is re-fastened to the mounting arm 13.

Certain modifications of the mirror design have been discussed above. Other modifications will occur to those practicing in the mirror art. For example, as discussed above, the display 26 may be arranged to display distance related information based on the output of a suitable sensing device such as a radar device. Additionally or alternatively, the display 26 may be arranged to display the distance related information supplied from other sources such as the camera 154.

As described above, the mirror housing printed circuit board 42 is supported by the left hand mirror housing 12L and the electronics module printed circuit board 60 is supported by the left hand electronics module 22L. Alternatively, the functions of the mirror housing printed circuit board 42 and the electronics module printed circuit board 60 may be provided by the junction box printed circuit board 32.

As also described above, the direction for the viewing angle of the camera 154 is changed by removing the clamp 178, rotating the camera assembly 24 to the new desired direction for the viewing angle of the camera 154, and then re-fastening the clamp 178 to the module housing 23. Instead, the camera 178 may be provided with a motor that can be remotely controlled by the user of the vehicle to change the direction for the viewing angle of the camera 154.

Accordingly, the above description is to be construed as illustrative only and is for the purpose of teaching those skilled in the art the best mode of carrying out the invention claimed below. The details may be varied substantially without departing from the spirit of the claimed invention, and the exclusive use of all modifications which are within the scope of the appended claims is reserved.

What is claimed is:

1. An add-on electronics module for attachment to an exterior mirror housing of a vehicle, the exterior mirror housing having an exterior housing surface having a convex end at a bottom of the exterior mirror housing and having a forward facing surface in a direction of vehicle travel and having a top of the exterior mirror housing, the add-on electronics module comprising:
   a module housing, wherein the module housing has a shape conforming to a shape of a bottom end of the exterior mirror housing so as to facilitate fitting of the add-on electronics module to the bottom of the exterior mirror housing, the module housing being shaped to receive at least a portion of the convex bottom end of the exterior housing surface of the external mirror housing in the module housing when the module housing is mounted on the external mirror housing, the module housing being shaped to be free of the top of the exterior mirror housing and to be free of portions of the forward facing surface of the exterior mirror housing, the module housing being shaped to match the bottom of the exterior mirror housing the module housing providing a rearwardly facing portion when mounted on the exterior mirror housing;
   fastening devices permitting the module housing to be fastened to the exterior mirror housing, wherein the fastening devices are arranged to facilitate fitting of the add-on electronics module to the exterior mirror housing; and
   electronics contained within and supported in the module housing.

2. The add-on electronics module of claim 1, further including a camera supported by the module housing, the camera being enclosed within the module housing when the module housing is mounted on the external mirror housing, the enclosure being formed by cooperative engagement of the external mirror housing and the module housing, the camera being directed through the rearwardly facing portion of the module housing.

3. The add-on electronics module as claimed in claim 2, wherein the electronics includes a printed circuit board populated by electrical components to form an operational electrical circuit that is operable to process image data from the camera.

4. The add-on electronics module of claim 1, further including a camera and a display on the rearwardly facing portion of the module housing.

5. The add-on electronics module of claim 1, wherein the fastening devices comprises holes through the module housing.

6. The add-on electronics module as claimed in claim 1, wherein the module housing is configured to fit onto a surface of the external mirror housing so that the bottom of the exterior mirror housing fits into the module housing.

7. The add-on electronics module as claimed in claim 6, wherein the module housing is cup-shaped and configured so that a portion of the external mirror housing fits into the cup-shaped module housing.

8. The add-on electronics module as claimed in claim 1, wherein the module housing is configured to be mountable to the external mirror housing without the module housing fitting into an opening or recess in the external mirror housing when mounted on the external mirror housing.

9. The add-on electronics module as claimed in claim 1, wherein the electronics includes a printed circuit board populated by electrical components to form an operational electrical circuit.

10. An add-on electronics module for attachment to an exterior mirror housing of a vehicle, the exterior mirror housing having an exterior housing surface having a convex end at a bottom of the exterior mirror housing and having a forward facing surface in a direction of vehicle travel and having a convex end at a top of the exterior mirror housing, the add-on electronics module comprising:
   a module housing, wherein the module housing has a shape conforming to a shape of the exterior mirror housing so as to facilitate fitting of the add-on electronics module to the exterior mirror housing, the module housing being shaped to receive at least a portion of the convex bottom end of the exterior housing surface of the external mirror housing in the module housing when the module housing is mounted on the external mirror housing, the module housing being shaped to be free of portions of the forward facing surface of the exterior mirror housing, the module housing being shaped to match the exterior mirror housing the module housing providing a rearwardly facing portion when mounted on the exterior mirror housing;
   fastening devices permitting the module housing to be fastened to the exterior mirror housing, wherein the fastening devices are arranged to facilitate fitting of the add-on electronics module to the exterior mirror housing; and
   electronics contained within and supported in the module housing.

* * * * *